May 20, 1952 E. P. TURNER ET AL 2,597,686
DESIGN-REPRODUCING APPARATUS AND STYLUS UNIT THEREFOR
Filed May 6, 1950 5 Sheets-Sheet 1

Inventors
Edgar P. Turner and
Norris H. Sailer
By
William P. Stewart
Attorney Witness
N. Leszczak

May 20, 1952     E. P. TURNER ET AL     2,597,686
DESIGN-REPRODUCING APPARATUS AND STYLUS UNIT THEREFOR
Filed May 6, 1950     5 Sheets-Sheet 2

Inventors.
Edgar P. Turner and
Norris H. Sailer

May 20, 1952     E. P. TURNER ET AL     2,597,686
DESIGN-REPRODUCING APPARATUS AND STYLUS UNIT THEREFOR
Filed May 6, 1950     5 Sheets-Sheet 4

Inventors
Edgar P. Turner and
Norris H. Sailer
By
William F. Stewart
Attorney

Witness
N. Leszczak

May 20, 1952 — E. P. TURNER ET AL — 2,597,686
DESIGN-REPRODUCING APPARATUS AND STYLUS UNIT THEREFOR
Filed May 6, 1950

Inventors.
Edgar P. Turner and
Norris H. Sailer

Patented May 20, 1952

2,597,686

UNITED STATES PATENT OFFICE 2,597,686

DESIGN-REPRODUCING APPARATUS AND STYLUS UNIT THEREFOR

Edgar P. Turner, Fanwood, and Norris H. Sailer, Union, N. J., assignors to The Singer Manufacturing Company, Elizabeth, N. J., a corporation of New Jersey Application May 6, 1950, Serial No. 160,486

21 Claims. (Cl. 112—102)

This invention relates to improvements in design-reproducing apparatus, and more particularly to apparatus for performing work upon a workpiece in accordance with a line on a drawing.

A more specific object of this invention is to provide an improved stylus means for a design-reproducing frame having a manually movable arm adapted to be shifted about in a plane adjacent the surface of a pattern drawing for the purpose of shifting a workpiece relative to a work-performing device.

A further object of the present invention is to provide a pantograph-equipped embroidering apparatus, including a zig-zag type sewing machine, with a pattern-tracking stylus head in which is incorporated means for giving the human operator a visual indication of the amplitude of lateral needle vibration.

With the above and other specific objects in view, the invention comprises the devices, combinations and arrangements of parts hereinafter described in connection with the accompanying drawings which illustrate a preferred embodiment of the invention, from which the several features of the invention and the advantages attained thereby will be readily understood by those skilled in the art.

Referring to the drawings, the present invention is broadly employed with an embroidery mechanism having a zigzag type sewing machine 20 and a manually controlled pantograph mechanism 21 of which one end portion carries an embroidery hoop 22 for presenting beneath the vibratory needle of the sewing machine the work to be monogrammed. The other end portion of the pantograph mechanism carries a stylus, generally designated by the numeral 23, which the operator employs for tracing a monogram stencil or pattern which may be presented beneath the pantograph. The movements of the embroidery hoop are directly controlled by the operator through the pantograph and thus the monogram formed in the work by the sewing machine corresponds to the stencil or pattern. For a more detailed description of a related pantograph and sewing machine unit, reference may be had to the U. S. Patent of Corrall No. 1,328,821, Jan. 27, 1920.

A knee shift lever 24 is provided for enabling the operator to vary the amplitude of lateral needle vibration so that the width of zigzag seams may be altered during the stitching operation to the end that the monogram outline may be of divers widths.

Referring particularly to Figs. 1, 2, 3 and 5, the present invention is incorporated in a table having a substantially flat upper surface 25 which is provided at one end portion with a conventional sewing machine cutout 26 for receiving therein the above noted zigzag sewing machine generally designated by the numeral 20. This cutout, and consequently the sewing head, may be set at an angle of 45° with the longitudinal axis of the table in order that the vertical and horizontal runs of the monogrammed work will have the same angle of stitches. In this connection, reference may be had to Fig. 7 wherein a monogram in the form of a letter L is disclosed and designated by the numeral 27. This monogram is formed by means of zigzag stitches 28, and it will be understood that with the machine head 20 disposed at the above noted 45° angle, the vertical and horizontal runs of the monogrammed work have the same angle of stitches. For the purpose of illustration, the distance between these stitches is greatly exaggerated.

Mounted directly beneath the table top 25 and upon a shelf 29 carried by the table legs 30, 30, is a horizontally disposed pantograph-supporting apron 31 which extends outwardly from beneath the table top 25 in order to expose the stylus-supporting end of the pantograph unit. This stylus-supporting end of the pantograph mechanism is carried directly upon the outwardly protruding apron 31 while the other end portion thereof is carried by the shelf 29 at a location beneath the table level and in vertical alignment with an opening 32 formed within the table surface. An arm 33 extends upwardly from the pantograph and through the table and is provided with a horizontal limb 34 which extends over the table 25 so as to support the embroidery hoop 22 directly over the sewing machine throat-plate and beneath the needle-bar mechanism.

The upper surface 35 of the protruding apron 31 may be formed from a flat piece of transparent material directly beneath which, and in a rectangular pocket 36 formed in the apron 31, a pattern or stencil sheet may be positioned. The stylus head 23 provided on the outwardly protruding end portion of the pantograph may be tracked about a given pattern carried in the apron pocket 36 so as to effect a corresponding movement of the embroidery hoop 22 to the end that the sewing machine will produce a monogram of predetermined shape.

The above noted protruding apron 31 is slidably mounted on track elements 37, 37 carried directly upon the shelf 29 so that it may be manually shifted crosswise of the table 25. This movement of the apron, which carries the stylus-supporting end of the pantograph, is effective to alter the pantograph-to-monogram ratio. An apertured indexing plate, generally designated by the numeral 38 is provided at the right-hand end portion of the apron (see Fig. 2) and a manually operable locking pin 39 is provided upon the shelf 29 for the purpose of locking the plate 38, and consequently the apron 31, in any one of several predetermined apron positions. Means, not herein disclosed, are provided in each of the two end portions of the pantograph unit for locking such ends respectively to the apron 31 and to the shelf 29, thereby to effect a relative adjustment of the pantograph ends upon the shifting of the apron. The specific construction details of the apron 31, together with the pantograph unit 21, do not form a part of this invention, and thus the details of these elements will not be fully described herein.

As hereinabove noted, the present apparatus includes a sewing machine of the so-called zigzag type which comprises a flat bed 40 affording a work support, and from one end of which rises a hollow standard 41 of a bracket-arm 41' overhanging the bed-plate and terminating in a needle-bar carrying head 42.

Figure 1:
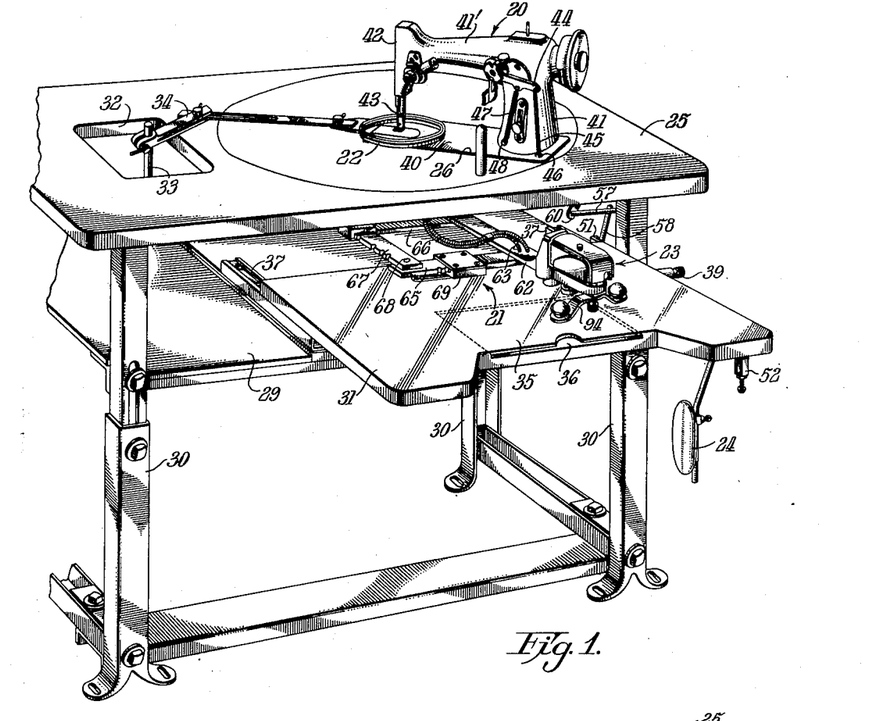
Fig. 1 represents a perspective view of a sewing machine and its supporting table with which the present invention is employed.
Figures 14, 15, 16:
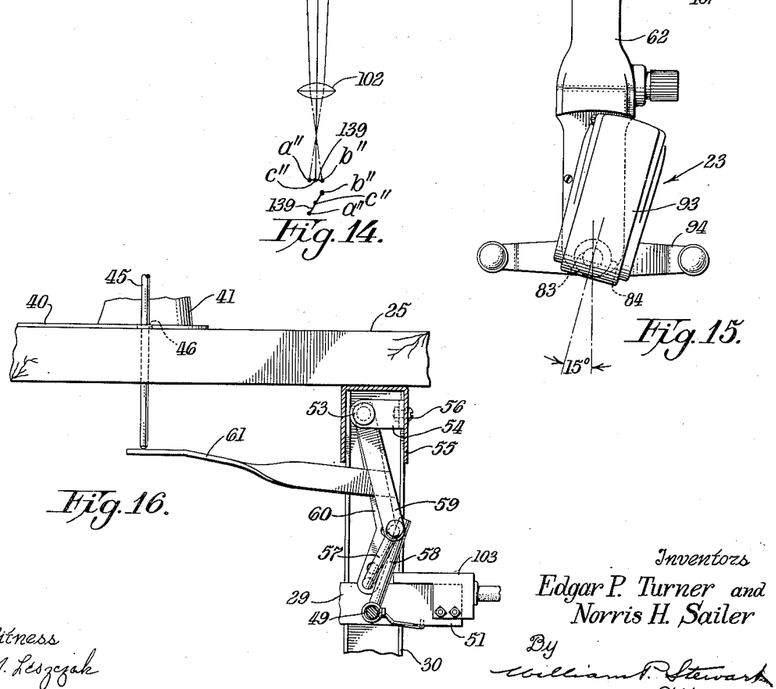
Fig. 14 represents a top plan view of the projected light spot shown in Fig. 13.
Fig. 15 represents a top plan view of one end portion of the pantograph unit together with its associated stylus head.
Fig. 16 represents, on an enlarged scale, a side elevation view, partly in section, of the table unit so as to disclose the manner in which the needle vibrating control mechanism of the sewing machine head is connected with the knee control lever.

The present sewing machine 20 is of a conventional zigzag type which includes a vertically reciprocatory and laterally vibratory needle 43 which is adapted to form zigzag stitches in a work material. Machines of this type employ means for varying the amplitude of lateral needle vibration from zero to a maximum amount and in the machine illustrated in Fig. 1 there is provided a lever arm 44 for this purpose. More specifically, the lever arm 44 is connected with a needle vibration control mechanism so that when the lever is in the position illustrated in Fig. 1 the needle is given no lateral vibratory movements and thus it is adapted to be reciprocated in a fixed vertical path. However, when the lever 44 is moved upwardly in a counter-clockwise direction it is adapted to impart a sidewise vibratory movement to the needle-bar; it being understood that the further the lever is moved the greater will be the amplitude of lateral needle vibration. Referring particularly to Figs. 1 and 16, it is to be noted that the free end portion of the lever 44 has pivotally connected thereto the upper end of a control link 45, the lower end portion of which projects downwardly through an aperture 46 provided in the sewing machine bed-plate 40 so that the lower end of the link may project beneath the surface of the table 25. From this it will be understood that the movement of this link 45 endwise of itself will shift the lever 44 about its pivot point so as to control the needle-bar vibratory mechanism. Referring specifically to Fig. 1, a coil spring 47 is illustrated as having its lower end portion secured to a pin 48 carried by the machine head while its upper end portion is secured directly to the lever 44 for the purpose of biasing the latter into its lowermost position which corresponds to the null position of the needle-bar vibratory mechanism.

For a more complete description of the above noted zigzag sewing machine with its accompanying vibratory needle-bar control, reference may be had to the U. S. Patent of Eames No. 2,005,673, June 18, 1935.

The above noted knee-shift lever 24 is in the form of a substantially inverted L-shaped crank, the horizontal limb 49 of which is journaled within a pair of apertured brackets 50 and 51 which are each secured directly to the adjustable apron 31. Also mounted upon the apron 31 is a substantially U-shaped bracket 52 which, as may be best observed from Fig. 2, functions to embrace a portion of the knee-shift lever so as to prevent the latter from shifting endwise within its journal bracket 50. The lever 24 is adapted to be operated by an operator's knee in the usual fashion.

As noted hereinabove, the free end portion of the needle-bar control lever arm 44 has pivotally connected thereto the above noted link 45, the lower portion of which extends through the aperture 46 provided in the sewing machine bed-plate 44 so as to permit its extreme lower end portion to project below the surface of the table. Means, hereinafter described, are provided for connecting the lower end portion of the member 45 to the knee-shift lever 24. Thus, the operator may vary the amplitude of the lateral needle vibration during the operation of the machine by means of the knee-shift lever 24 to the end that the width of the zigzag seams may be altered. In this connection, reference may be had to Fig. 7 wherein the monogram is illustrated as a letter L. It will be observed that the width of this letter varies throughout its length so that in order properly to form such a letter by means of stitches it will be necessary to vary the amplitude of the lateral needle vibration. Thus, the present apparatus is provided with mechanism which may be controlled by the above noted knee-shift lever 24 so that a movement of such lever will vary the amplitude of lateral needle vibration.

As hereinabove noted, the operator may vary the pattern-to-monogram ratio by shifting the apron 31 relative to the shelf unit 29. This movement of the apron also varies the knee-shift linkage system so that the ratio of movement of the shift lever 24 relative to that of the needle-control lever 44 may be altered and the maximum throw of the needle may be made to vary with the monogram size while the knee-shift lever is still adapted to be moved in accordance with the pattern size.

Figure 2:
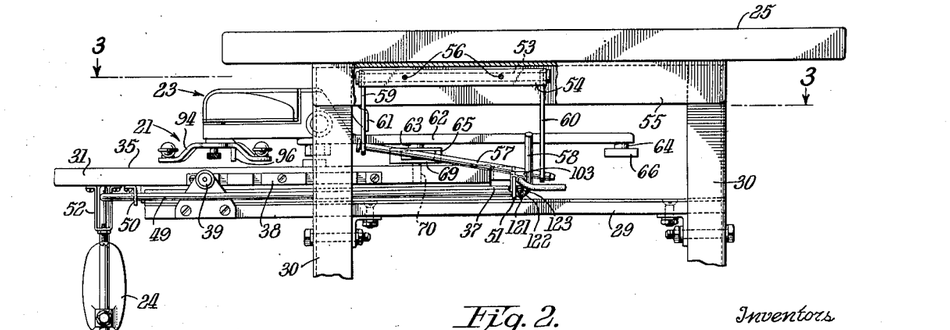
Fig. 2 represents a fragmentary right-hand end view of the unit disclosed in Fig. 1.
Figures 3, 4:
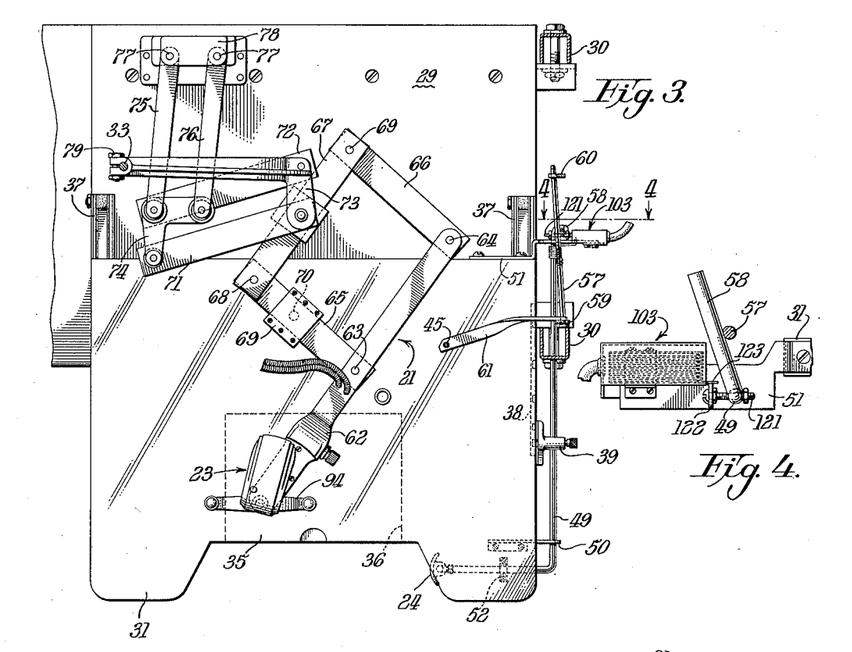
Fig. 3 represents a sectional view taken substantially along the line 3—3 of Fig. 2.
Fig. 4 represents, on an enlarged scale, a side elevational view taken substantially along the line 4—4 of Fig. 3.

More specifically, the present knee-shift linkage system comprises a horizontally disposed shaft 53, the opposite end portions of which are journaled in the end portions of a box-like bracket generally designated by the numeral 54. Referring particularly to Figs. 2 and 16, this bracket 54 may be secured to upper leg channel member 55 by means of bolts 56, 56. It is to be understood that the shaft 53 is disposed in parallelism with the horizontal limb 49 of the knee-shift lever 24. Carried upon the opposite end portions of the shaft 53 are a pair of arms of unequal length which are connected together at their free end portions by means of a rod 57 which engages a crank arm 58 carried by the horizontal limb 49 of the knee-shift lever. The shorter of these two arms is designated by the numeral 59 while the longer one is designated by the numeral 60. Thus, in effect, the arms 59 and 60, together with the inclined rod 57, form a crank which engages the crank 58 so as to transmit motion from the knee-shift lever 24 to the shaft 53. Furthermore, the rod 57 forms a substantially inclined cam portion of this crank so that when the knee shift lever 24 is shifted lengthwise of its horizontal limb 49, the effective lever arm ratio between such cranks is varied. Still referring to Figs. 2 and 16, it is to be understood that the short arm 59 is provided with a crank element 61 which is adapted to underlie directly the lower end portion of the depending connecting element 45. The above noted coil spring 47 functions to bias the lever 44, together with the connecting element 45, downwardly thereby to force the lower end portion of the element 45 into operable engagement with the underlying crank 61. The inclined rod 57, carried by the two depending arms 59 and 60, forms, as above noted, an angle with the horizontal limb 49 of the knee-shift lever and thus, when the apron 31 is shifted relative to the shelf 29, the crank arm 58 and the rod 57 are moved relative to each other to the end that their effective lever ratios are varied. Thus, an increment of movement of the knee-shift lever 49 about its longitudinal axis can produce various amplitudes of endwise movement in the connection link 45 depending upon the amount of lengthwise adjustment of the knee-shift lever arm 49 relative to the inclined rod 57.

From the above, it will be appreciated that a rotary movement of the knee-shift lever 24 about the longitudinal axis of its horizontal limb 49 from its zero position will be effective to operate the above noted lever arm 44 which, in turn, functions to control the amplitude of lateral needle vibration. As the movement of the knee-shift lever arm 24 is increased in a counterclockwise direction, as viewed in Fig. 1, the lever arm 44 will be shifted also in a counterclockwise direction thereby to increase the amplitude of lateral needle-bar vibrations from zero to maximum. Also, if the knee-shift lever 24 is moved endwise of its horizontal limb 49, it will function to alter the effective lever ratio between its crank portion 58 and the inclined rod 57 so that a given amplitude of rotary motion of the knee-shift lever will produce selective amplitudes of lateral needle-bar vibration.

For a more complete description of this particular knee-shift control lever, together with its variable linkage system, reference may be had to a pending U. S. patent application of E. P. Turner entitled "Control Means for Sewing Machines," which application was filed on or about May 5, 1950, and bears Serial No. 160,271.

The above noted pantograph device comprises a manually movable arm 62 which is pivotally secured by means of pins 63 and 64 to a pair of link arms 65 and 66 each of which latter elements are in turn pivotally secured to a third link arm 67 by means of pins 68 and 69 thereby to form a conventional pantograph structure. Embracing the link arm 65 is a collar member 69 which, as may be best seen from Fig. 2, is pivotally mounted upon the apron 31 by means of a pin 70. From this it will be understood that movement of the main arm 62 will function to shift the various pantograph links relative to each other and the entire unit will pivot about the pin 70 in the usual fashion. Attached to the above described main portion of the pantograph mechanism is an auxiliary mechanism which includes a pair of parallel arms 71 and 72 each of which is pivotally secured at its one end portion to an arm 73 as by means of appropriate pins. The other end portion of each of the arms 71 and 72 is pivotally secured to one limb of a bell-crank lever 74 by means of appropriate pin elements. The other limb of the bell-crank lever 74 is pivotally secured to the end portions of each of a second pair of parallel arms designated by numerals 75 and 76, which arms are pivotally secured at their other end portions by means of pins 77, 77 to a block 78 which is fixedly secured to the shelf member 29.

The free end portion of the arm 73 is provided with a suitable clamping mechanism 79 for the purpose of adjustably carrying the above noted upstanding arm 33 which projects upwardly through the table aperture 32 so as to support upon its upper end portion the above noted work-holding member 34.

Figures 5, 6, 7:
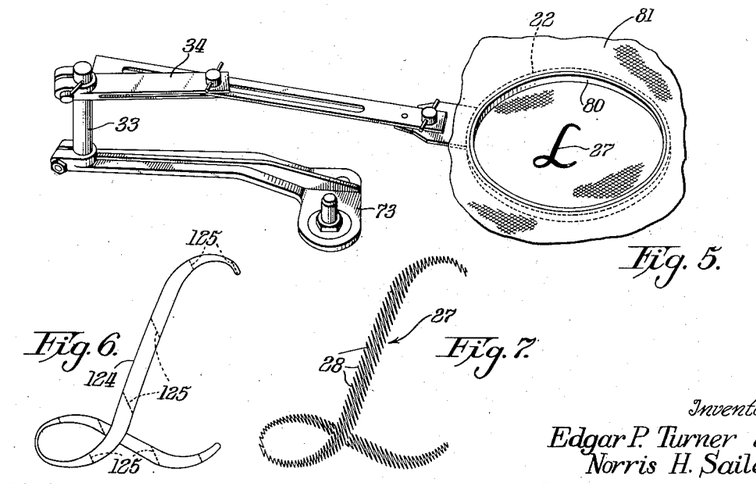
Fig. 5 represents, on an enlarged scale, a perspective view of the work-holding implement employed in the present apparatus, which implement is illustrated as carrying a fabric workpiece.
Fig. 6 represents, in a diagrammatic manner, a pattern in the shape of the letter L which is adapted to be tracked by the stylus head of the pantograph unit.
Fig. 7 represents, in a diagrammatic manner, a monogram formed by means of zigzag stitches.

As is best disclosed in Fig. 5, the work-holding member 34 includes inner and outer nested hoop elements 22 and 80 which are adapted to maintain therebetween a piece of fabric generally designated by numeral 81. This hoop structure is of a conventional nature and thus a detailed description of it is not necessary. From the above, it will be readily appreciated by those skilled in the art that as the stylus head 23, which is carried by the free end portion of the pantograph arm 62, is tracked about the lines of a pattern drawing disposed within the pocket 36 of the apron 31, the hoop elements 22 and 80 will faithfully reproduce the motions of the stylus head all in a conventional fashion. Thus, if the pattern drawing illustrates, for example, a letter L and the stylus head 23 is tracked about such letter, the work material 81 will be appropriately shifted beneath the vertically reciprocatory and laterally vibratory needle 43 so that as a result the sewing machine will produce stitches upon the workpiece in a manner such that a monogram in the shape of an L will be formed as illustrated in Figs. 5 and 7. The present pantograph unit may take any conventional form, and since the details of the pantograph construction do not form a part of the present invention, no further description of it is deemed necessary.

As hereinabove noted, the present invention contemplates the provision on the present pantograph unit of a stylus head in which is incorporated means for giving the operator a visual indication of the amplitude of lateral needle vibration. Briefly stated, this means produces upon a pattern drawing a light spot in the form of an elongated beam the length of which is made to vary in accordance with the variations in the needle throw amplitude. Thus, the operator at all times will be advised visually as to the width of the monogram which the sewing machine is producing upon the workpiece. As will be hereinafter described in more detail, this light spot is produced by a bank of lamps carried in the stylus head 23 and energized successively in proportion to the movement of the knee-shift lever by means of a progressively acting switch.

Figure 8:
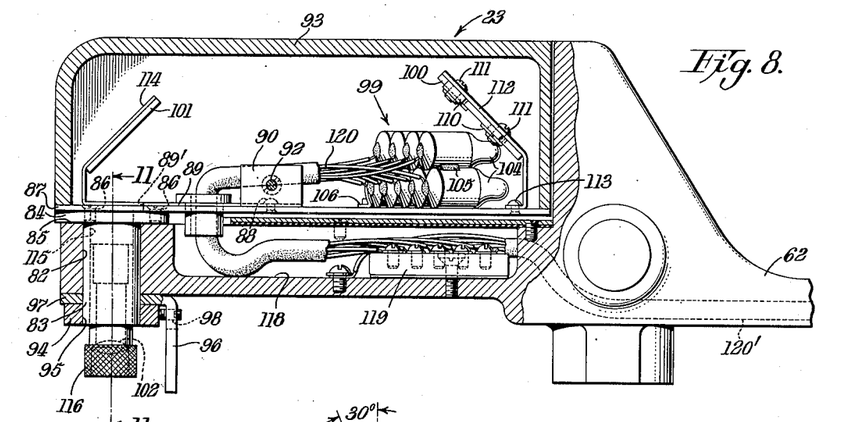
Fig. 8 represents a longitudinal sectional view through the stylus head illustrated in Fig. 1.
Figure 9:
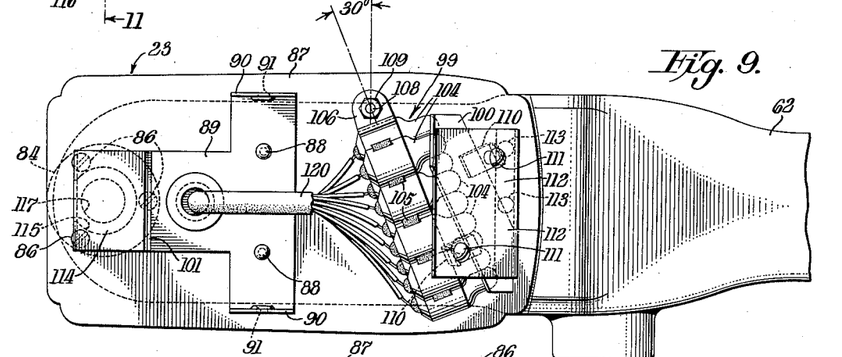
Fig. 9 represents a top plan view of the stylus head with the cover portion thereof removed.

Considering now more specifically the stylus head 23, it may be best observed in Figs. 8 and 9 that this head is carried upon the free end portion of the manually operable pantograph arm 62. The free end portion of the arm 62 is provided with a vertically disposed aperture 82 within which is rotatably mounted a hollow cylinder 83 having an upper circular flange 84 which rests upon the flat shoulder portion 85 of the arm 62. Mounted upon the flange 84, by means of a plurality of screws 86, 86, is a platform member 87 which supports the entire stylus head 23. Suitably secured upon the platform member 87, as by means of rivets 88, 88, is a sheet metal bracket-member 89 having a pair of oppositely disposed and upstanding ear-members 90. Each of these ear-members is provided with a threaded aperture 91 for receiving a screw 92 which functions to secure upon the platform 87 a cover element 93. The above noted light beam apparatus is entirely enclosed within this cover element 93. Furthermore, it will be appreciated that the cover element 93, together with the platform member 87 and the supporting cylinder 83, is adapted to pivot about a vertical axis which corresponds to the longitudinal axis of the aperture 82.

Referring particularly to Figs. 2, 8 and 15, it will be observed that the lower end portion of the stylus head supporting cylinder 83 projects below the lower surface of the pantograph arm 62. A handle member 94 is provided with a central aperture 95 which permits the handle to be received directly over the distal end of the cylinder 83 while a substantially L-shaped member 96 functions to lock the handle member directly upon the cylinder so that a turning movement of the handle will function to carry with it the entire stylus head 23. More specifically, the member 96 has its upper limb 97 appropriately apertured so as to be received over the cylinder 83 and between the pantograph arm 62 and the handle member 94. A set screw 98 threaded within the member 96 functions, when tightened against the handle member 94, to clamp both the member 96 and the handle member against the cylinder 83 so that, as above indicated, the movements of the handle will carry with it the entire stylus head 23.

Disposed within the stylus head 23 and upon the platform member 87 are a series of incandescent lamps, generally designated by the numeral 99, which lamps are arranged with a pair of mirrors 100 and 101 and a lens 102 (see Fig. 11) so that the images from the lamp filaments projected onto the pattern drawing contained within the apron pocket 36 adjoin each other to form an elongated light spot the length of which may be varied by the selective switching of the lamps. A conventional multiple leaf switch, generally designated by the numeral 103, operated from the knee-shift lever 24 which controls the needle vibratory throw, successively turns on more lamps as the throw increases so that the length of the light spot is a measure of the needle throw at any instant. In this arrangement the central lamp is not de-energized but remains on at all times and corresponds to the central or null position of needle vibration. Then, as the needle vibratory throw increases in response to further movement of the knee-shift lever, the lamps are energized, one-by-one, alternately on either side of said central lamp, until, when maximum needle throw is obtained, all lamps are lighted and the light spot has its maximum length.

Figures 10, 11:
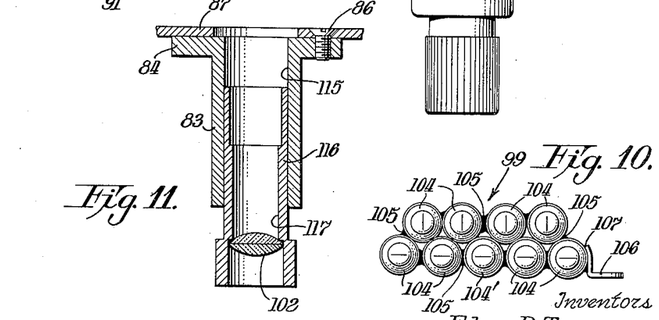
Fig. 10 represents a front elevation view of two banks of electrical lamps employed in the present stylus head.
Fig. 11 represents, on an enlarged scale, a sectional view taken substantially along the line 11—11 of Fig. 8.

Referring particularly to Figs. 8, 9 and 10, it is to be observed that in order to secure close lateral spacing of the lamp filaments, small 6–8 volt miniature pilot lamp bulbs, each of which may be generally designated by the numeral 104, having reduced bulb diameters are employed in a two-bank staggered arrangement. More specifically and as best disclosed in Fig. 10, five lamps occupy the bottom row while four lamps occupy the top row, the lamps of each row being in side-by-side parallel relation with both banks of lamps so staggered that the three central lamps of the bottom row "look" through between the lamps of the top row. All of these lamps are soldered together as at 105 to form a unitary assembly which is secured directly to the platform member 87 by means of a bracket 106 of which one leg is soldered to the lamps as at 107 while the other leg is secured directly to the platform member 87 by means of a bolt 108 and a nut 109, as may be best observed in Fig. 9. Still referring to Fig. 9, it will be observed that the lamp assembly is disposed within the stylus head so that it will form an angle of 30° with the transverse axis of the platform member 87 for a purpose which will be hereinafter described.

As may be best seen from Figs. 8 and 9, the above noted mirror 100 is secured by means of bracket arms 110, 110, and screws 111, 111, to a bracket member 112, the lower portion of which is rigidly secured to the platform 87 by means of rivets 113. It will be observed that the upper portion of the bracket member 112 is bent at an angle of approximately 45° relative to the platform member so as to receive the light from the lamps in a manner such that this light will be projected to the second mirror 101 which may be adhesively secured to a second bracket member 114. This second mirror functions to direct the light from the lamp filaments downwardly along the pivot axis of the stylus head so that this light will pass through the lens 102 and be projected upon the pattern drawing which is disposed within the apron pocket 36. More specifically, the second bracket 114 has its mirror-carrying portion disposed at an angle of approximately 45° relative to the platform member 87 while the lower portion of this bracket is an integral part of the above noted bracket 80. As may be seen from Figs. 8 and 13, the bracket 89 is apertured at 89' so as to permit the light to pass therethrough.

By referring particularly to Figs. 8 and 11, it will be observed that the stylus-carrying cylinder 83 is provided with a central aperture 115 in which is telescopically mounted a lens carrier 116. This lens carrier 116 is formed as a hollow cylinder and has within its tubular portion 117 a conventional lens 102. It will be manifest to those skilled in the art that by adjusting the lens carrier 116 lengthwise of and within the cylinder 83 the light spot formed by the light from the lamps 99 may be properly brought into focus upon the pattern drawing.

Referring again to Fig. 8, the forward portion of the pantograph arm 62 is provided with a recess 118 in which is mounted a conventional terminal block 119 which functions to connect the various lamps of the assembly 99 to a proper source of electrical supply through the medium of two bundles of conduits generally designated by the numerals 120 and 120'.

Referring now particularly to Figs. 2, 3, 4 and 17, the above noted switch 103 is carried upon the bracket 51 which is secured directly to the apron 31, and the above noted horizontal limb 49 of the knee-shift lever arm 24 carries a screw 121 the free end portion of which carries a washer 122 which underlies an actuating arm 123 of the switch 103. Thus, as the arm 49 is rotated within its brackets 50 and 51, in a clockwise direction, as viewed in Fig. 4, the washer 122 will function to raise the switch-actuating arm 123 so as successively to energize the light bulbs in a manner as above indicated. Conversely, when the knee-shift lever arm 49 moves in a counterclockwise direction within its bracket elements, the switch-actuating arm 123 will be lowered so that the various light bulbs will be de-energized to the end that merely the center bulb of the lower bank will be left energized. Thus, as the knee-shift lever is actuated for the purpose of increasing or decreasing the amplitude of needle vibration, the operator by merely observing the pattern drawing will be advised by means of the light spot as to the exact amplitude of needle vibration. For example, reference may be had to Fig. 6 wherein a letter L designated by the numeral 124 is disclosed as illustrating the type of pattern drawing which may be inserted within the pocket 36 of the apron 31. In order to produce the monogram 27, illustrated in Fig. 7, upon the workpiece in a manner as disclosed in Fig. 5, it is necessary for the operator to track the longitudinal axis of the pattern letter 124 by means of the stylus head light beam. Quite obviously, as the width of the letter L 124 varies, it will be necessary for the operator to vary the amplitude of lateral needle vibration. Thus, by manipulating the knee-shift lever 24, the operator can simultaneously alter the amplitude of lateral needle vibration and the length of the light spot, which in Fig. 6 is illustrated by means of dotted lines 125. From this it will be readily appreciated that the operator, by forcing the light spot to span merely the distance between the border lines of the letter L, can effectively produce a monogram within the work material which will directly correspond to the pattern drawing.

Figure 17:
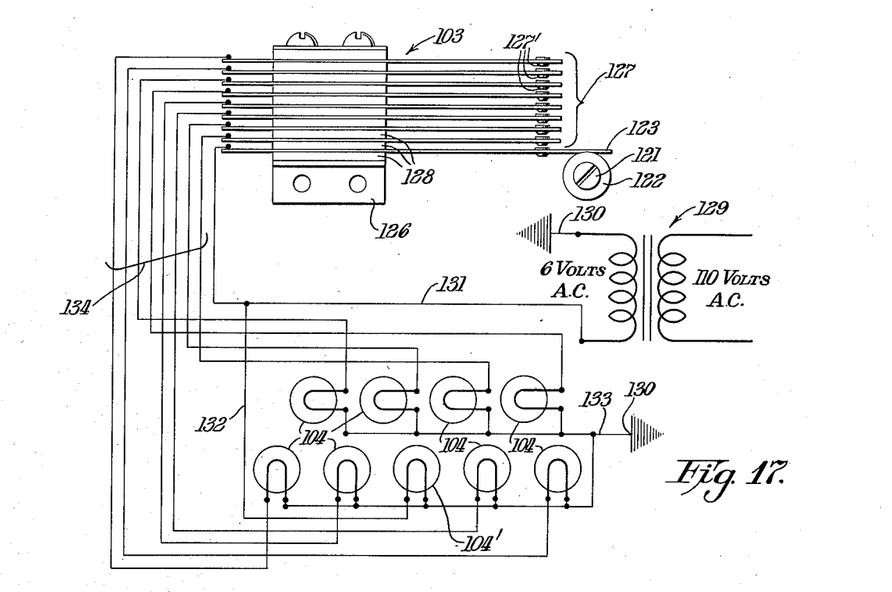
Fig. 17 represents a wiring diagram which illustrates the manner in which the light bulbs of the stylus head are successively energized and de-energized.
Figure 18:
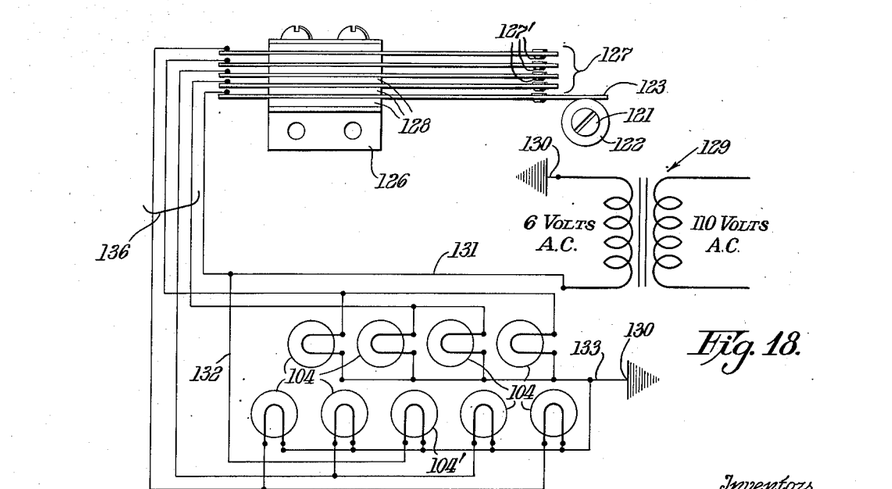
Fig. 18 represents a wiring diagram of a modified form of light bulb control mechanism.

Referring now particularly to Figs. 17 and 18, the progressively actuating switch 103 is illustrated in a somewhat diagrammatic manner. More specifically, this switch comprises a platform member 126 which, in a conventional fashion, supports the actuating arm 123 as well as a plurality of contact arms which are generally designated by the numeral 127. All of these arms are insulated from each other by means of suitable non-conducting pads 128. Fig. 17 also illustrates the actuating washer 122 which functions to raise the switch actuating arm 123 in a manner such that this arm will successively be electrically connected to each of the contact arms 127 through the medium of the contacts 127' carried by such arms. The present apparatus employs a conventional transformer 129 one side of which may be connected to a suitable source of electrical energy such as 110 volts A. C. The other side of the transformer may be provided with two terminals of which one is connected to ground as at 130 while the other may be connected directly to the switch-actuating arm 123 and to one terminal of the above noted central light bulb 104' by means of conductors 131 and 132. It is to be also noted that one of the two terminals of each of the light bulbs is connected to ground by means of a conductor 133. The remaining terminal of each of the light bulbs, with the exception of the central bulb 104', is connected to a respective one of the switch contact arms 127 by a suitable one of the eight conductors which are generally designated by the numeral 134. From this it is clear that when the transformer 129 is connected to a suitable source of power the central light bulb 104' will be energized while each of the remaining light bulbs will be de-energized due to the fact that the various contact arms 127 are not connected with the actuating arm 123. However, when the knee-shift lever arm 24 is rotated in a clockwise direction, as viewed in Fig. 4, the washer 122 will be elevated so that the arm 123 will successively contact each of the arms 127 thereby successively to energize the bulbs one-by-one, alternately on either side of the central lamp 104' so as progressively to increase the length of the projected light spot. Conversely, when the washer 122 is lowered, the lamps will be successively de-energized so as to shorten the light spot.

Referring now to Fig. 18, there is illustrated a modified form of switching arrangement which functions to energize and de-energize the various lights in pairs rather than in an alternate manner as was illustrated in Fig. 16. This modified system utilizes the same transformer arrangement as illustrated in Fig. 17, and, furthermore, one leg of the transformer is connected to ground as at 130 while the other leg is connected directly to the switch-actuating arm 123 and to one terminal of the central lamp 104' by means of conductors 131 and 132. Also, one terminal of each of the lamps, including the central lamp 104', is connected to ground by means of a conductor 133 so that with the switching arrangement as illustrated in Fig. 18 the central lamp 104' is energized while the remaining lamps are de-energized. It will be observed that the remaining terminals of all of the lamps, with the exception of lamp 104', are connected to the switch arms 127 in pairs by means of conductors 136 so that as the main actuating arm 123 is elevated to contact the arms 127 one lamp at each side of the central lamp will be energized and the light spot will be progressively lengthened in a symmetrical manner.

As hereinabove noted, the sewing machine 21 is disposed within its cutout 26 so that the needle-bar 43 will vibrate laterally in a direction which is disposed substantially at 45° relative to the longitudinal axis of the table so that the vertical and horizontal runs of a monogram letter will have the same angle of stitches. With this particular disposition of the sewing machine, it is clear that the above described light spot system should be designed so that the elongated light spot projected upon the pattern drawing will be disposed in parallelism with the direction of lateral needle vibration. The present invention contemplates a disposition of the light bulbs such that this condition of parallelism will exist. For example, by referring to Fig. 9, it is to be noted that the lamp assembly 99 is disposed at an angle of 30° relative to the transverse axis of the stylus platform 87. Actually this angle should be 45° in order to produce the above noted condition of parallelism, but it has been found more convenient, due to the space limitations of the stylus head, to dispose the lamps at this 30° angle and then compensate for the difference between the desirable 45° and the actual 30° by shifting the stylus head 23 in a clockwise direction 15° relative to the handle member 94 in a manner as is best disclosed in Fig. 15. In utilizing the present pantograph system, the operator grasps each of the free end portions of the handle member 94 and tracks the pattern drawing in a manner such that the handle will remain in parallelism with the longitudinal axis of the table 25 at all times, and thus by so shifting the stylus head 23 relative to the handle, the projected light spot will be found to be substantially in parallelism with the direction of lateral needle-bar vibration.

Figure 12:
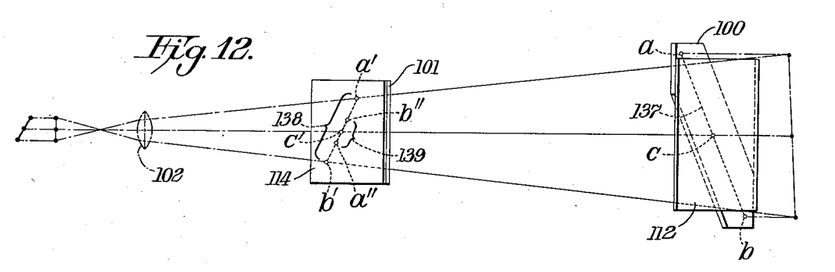
Fig. 12 represents, in a diagrammatic manner, a top plan view of the lens and reflector system employed in the stylus head illustrated in Fig. 8.
Figure 13:
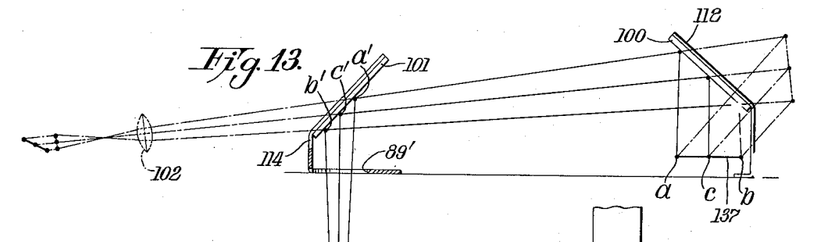
Fig. 13 represents a side elevation view of the elements disclosed in Fig. 12.

In order to understand fully the present mirror and lens system, reference may be had to Figs. 12 and 13 which diagrammatically illustrate the manner in which the light from the various lamps is collected and projected onto the pattern drawing. Referring particularly to these two figures, the line 137 represents, for example, the lower bank of lamp bulbs while the dots $a$, $b$, $c$ represent, respectively, the two end lamps and the central lamp of the lower lamp bank. Thus, the light from these three lamps will be projected from the line 137 to the mirror 100 from which it will be reflected to the second mirror 101 so as to be reflected downwardly through the lens 102 which functions to focus the beam upon the pattern drawing. The solid lines of the Figs. 12 and 13 illustrate the actual light paths while the phantom lines behind the mirrors illustrate the imaginary light paths which determine the so-called visual images. From this it will be appreciated that the two mirrors 100 and 101 function to reverse the angle of the light spot relative to the angle of the lamp bank assembly when the longitudinal axis of the platform 87 is used as a reference. More specifically, and referring to Fig. 12 it will be noted that the angle of the line 137 relative to the transverse axis of the platform 87 is completely reversed from that of the line 138 which represents the reflected image of the line 137 in the mirror 101. From this it will be understood that this is the reason why the lamp unit 99 is disposed at an angle relative to the transverse axis of the platform 87, which is substantially the reverse of that formed by the path of lateral needle vibration. Fig. 14, represents a top plan view of the projected light spot 139 shown in Fig. 13, and it will be appreciated that this light spot forms, as does the light bank assembly 99, an angle of 30° relative to the transverse axis of the platform 87. Now referring to Fig. 15, it is manifest that with the arm 94 of the stylus head 23 disposed in parallelism with the longitudinal axis of the table and with the stylus head 23 disposed at an angle of 15° with such arm, the light spot 139 which is projected upon the pattern drawing will form an angle of 45° with the longitudinal axis of the table to the end that the light spot will be disposed in parallelism with the normal path of lateral needle vibration. Furthermore, since the operator in utilizing the present pantograph, tracks the projected light spot 139 about the lines of a pattern drawing with the stylus handle 94 disposed at all times in parallelism with the longitudinal axis of the table, it will follow that the light spot will at all times be disposed in parallelism with the path of lateral needle vibration.

As above noted, the line 137 is defined by the dots $a$, $b$ and $c$ which represent, respectively, the two end lamps and the central lamp of the lower lamp bank. Referring to Figs. 12, 13 and 14, it will be noted that the line 138, which represents the reflected image of the line 137 in the mirror 101, is actually defined by the dots $a^1$, $b^1$ and $c^1$ which, of course, are the light spots formed directly by the reflected images of the lamps $a$, $b$ and $c$. By the same token, the line 139 is defined by the dots $a''$, $b''$ and $c''$ which are the light spots formed on the pattern drawing by the reflected images from the lamps $a$, $b$ and $c$.

Of course, a certain amount of the light from the lamp filaments will be diffused to the end that the lens 102 will transmit to the pattern drawing a faint circular spot of light which might or might not be discernible by the human eye depending upon the amount of general illumination available in the area in which the machine is operated. However, the major portion of the light from each lamp filament will be transmitted by the mirrors 100 and 101 and the lens 102 as a discrete light spot, and due to the arrangement of the lamps in a pair of elongated stacked banks, the images from all of the energized filaments will be projected onto the pattern drawing to form a straight row of adjoining discrete light spots which, in effect, form an elongated light beam, the length of which is made to vary by the selective switching of the lamps. As a matter of fact, when all nine of the lamps are energized the human eye will readily detect upon the pattern drawing nine discrete light spots which make up the elongated light beam 139 (see Fig. 14). With all nine of the lamps energized, the beam 139 will be of maximum length, but as the outside or end lamps are de-energized the length of the beam 139 will become successively shorter.

Referring to Fig. 13, it will be noted that the mirrors 100 and 101 are not actually disposed at 45° relative to the horizontally disposed platform 87. This is for the reason that in the actual construction of the stylus head it was found more convenient to dispose each of the mirrors at a slightly different angle, but it will be readily appreciated that the mirrors could each be readily disposed at 45° relative to the platform with very little change in the stylus head construction. Furthermore, with the lamp assembly 99 disposed at an angle of 45° relative to the transverse axis of the platform 89 it would not be necessary to offset the stylus head 15° relative to its handle 94.

Having thus set forth the nature of the invention, what we claim herein is:

1. An apparatus for performing work upon a workpiece in accordance with a line on a drawing, comprising a work-performing device, a manually operable design-reproducing frame, a stylus head carried by one end of said frame for tracking the drawing, means carried on the other end of said frame for causing relative motion between said work-performing device and the work, means carried by the stylus head for throwing a spot of light upon the drawing for directly tracking the drawing lines, and means for varying the dimensions of the light spot.

2. An apparatus for performing work upon a workpiece in accordance with a line on a drawing, comprising a work-performing device for operating upon the work along a path of finite width, means for varying the width of the work path, a manually operable design-reproducing frame, a stylus head carried from one end of said frame for tracking the drawing, means carried on the other end of said frame for causing relative motion between said work-performing device and the work, means carried by the stylus head for throwing a spot of light upon the drawing for directly tracking the drawing lines, and means for varying the dimensions of the light spot in accordance with the width of the work path.

3. An apparatus for performing work upon a workpiece in accordance with a line on a drawing, comprising a work-performing device for operating upon the work along a path of finite width, a manually operable design-reproducing frame, a stylus head carried by one end of said frame for tracking the drawing, means carried on the other end of said frame for causing relative motion between said work-performing device and the work, means carried by the stylus head for throwing a spot of light upon the drawing for directly tracking the drawing lines, and means for simultaneously varying the width of the work path and the dimensions of the light spot so that the light beam will give a visual indication of the work path width.

4. An apparatus for performing work upon a workpiece in accordance with a line on a drawing, comprising a work-performing device for operating upon the work along a path of finite width, means for varying the width of the work path, a manually operable design-reproducing frame, a stylus head carried by one end of said frame for tracking the drawing, means carried on the other end of said frame for causing relative motion between said work-performing device and the work in response to the movements of said frame, means including a bank of electrical lamps carried by said stylus head for throwing a spot of light upon the drawing for directly tracking the drawing lines, and switching means connected with said lamps for successively energizing and de-energizing said lamps in a predetermined sequence thereby to vary the dimensions of the projected light spot.

5. An apparatus for performing work upon a workpiece in accordance with a line on a drawing, comprising a work-performing device for operating upon the work path along a path of finite width, a manually operable design-reproducing frame, a stylus head carried by one end of said frame for tracking the drawing, means carried on the other end of said frame for causing relative motion between said work-performing device and the work, means including a bank of electrical lamps carried by said stylus head for throwing a spot of light upon the drawing for directly tracking the drawing lines, switching means connected with said lamps for successively energizing and de-energizing said lamps in a predetermined sequence thereby to vary the dimensions of the projected light spot, and means for simultaneously varying the width of the work path and operating said switch so that the light spot will give a visual indication of the work path width.

6. A stylus head for a design-reproducing frame capable of movement relative to a pattern drawing, said stylus head including a bank of electrical lamps, means for projecting the light from all of said lamps upon the drawing substantially in the form of a single beam, and a progressively acting switch connected with said lamps for successively energizing and de-energizing said lamps in a predetermined sequence thereby to vary the dimensions of the projected beam.

7. A stylus head for a design-reproducing frame capable of movement relative to a pattern drawing, said stylus head including a bank of electrical lamps disposed substantially in side-by-side parallel alignment, means for projecting the light from all of said lamps upon a pattern drawing so as to form upon said drawing a substantially single elongated light spot for tracking the drawing lines, and a progressively acting switch connected with said lamps for successively energizing and de-energizing said lamps in a predetermined sequence thereby to vary the length of the light spot.

8. A stylus head for a design-reproducing frame capable of movement relative to a pattern drawing, said stylus head including a first bank of electrical lamps disposed substantially in side-by-side parallel alignment, a second bank of electrical lamps disposed directly adjacent and in staggered arrangement with said first bank, means for gathering the light emanating from all of said lamps and for projecting such light toward the pattern drawing and in a direction substantially at right angles to a plane defined by the longitudinal axes of the lamps of one of said banks so as to form upon said drawing a substantially single elongated light spot for tracking the drawing lines, and means for varying the length of the light spot.

9. A stylus head for a design-reproducing frame capable of movement relative to a pattern drawing, said stylus head including a first bank of electrical lamps disposed substantially in side-by-side parallel alignment, a second bank of electrical lamps disposed directly adjacent and in staggered arrangement with said first bank, means for gathering the light emanating from all of said lamps and for projecting such light toward the pattern drawing and in a direction substantially at right angles to a plane defined by the longitudinal axes of the lamps of one of said banks so as to form upon said drawing a substantially single elongated light spot for tracking the drawing lines, and a progressively acting switch connected with said lamps for successively energizing and de-energizing said lamps in a predetermined sequence thereby to vary the length of the elongated light spot.

10. A stylus head for a design-reproducing frame capable of movement relative to a pattern drawing, said stylus head including a bank of electrical lamps, means including a pair of light-reflecting elements for gathering the light emanating from all of said lamps, a lens for receiving the light gathered by said reflecting elements and for projecting such light upon a pattern drawing so as to form thereupon a substantially single elongated light spot for tracking the drawing lines, and means for varying the length of the light spot.

11. In a design-reproducing frame having a manually movable arm adapted to be shifted about in a plane adjacent the surface of a flat pattern drawing, the combination of a stylus head comprising, a platform pivotally mounted upon said frame arm about an axis transverse to the plane of frame-arm movement, a bank of electrical lamps disposed substantially in side-by-side parallel alignment upon said platform, means for projecting the light emanating from said lamps along the pivot axis of said platform and toward the pattern so as to form thereon a substantially single elongated light spot for tracking the drawing lines and means for varying the length of the light spot.

12. In a design-reproducing frame having a manually movable arm adapted to be shifted about in a plane adjacent the surface of a flat pattern drawing, the combination of a stylus head comprising, a platform pivotally mounted upon said frame arm about an axis transverse to the plane of frame-arm movement, a bank of electrical lamps disposed substantially in side-by-side parallel alignment upon said platform, means for projecting the light emanating from said lamp along the pivot axis of said platform and toward the pattern so as to form thereon a substantially single elongated light spot for tracking the drawing lines, and a progressively acting switch electrically connected with said lamps for successively energizing and de-energizing said lamps in a predetermined sequence thereby to vary the length of the elongated light spot.

13. In a design-reproducing frame having a manually movable arm adapted to be shifted about in a plane adjacent the surface of a flat pattern drawing, the combination of a stylus head comprising, a platform pivotally mounted upon said frame arm about an axis transverse to the plane of frame-arm movement, a bank of electrical lamps disposed substantially in side-by-side parallel alignment upon said platform, means including a pair of light-reflecting elements for gathering the light emanating from said lamps and for directing such light along the pivot axis of said platform, a lens disposed along said pivot axis for directing such light toward the pattern so as to form thereon a substantially single elongated light spot for tracking the drawing lines, and means including a progressively acting switch electrically connected with said lamps for successively energizing and de-energizing said lamps in a predetermined sequence thereby to vary the length of the elongated light spot.

14. In a design-reproducing frame having a manually movable arm adapted to be shifted about in a plane adjacent the surface of a flat pattern drawing, the combination of a stylus head comprising, a platform pivotally mounted upon said frame arm about an axis transverse to the plane of frame-arm movement, a bank of electrical lamps disposed substantially in side-by-side parallel alignment upon said platform, means for projecting the light emanating from said lamps along the pivot axis of said platform and toward the pattern so as to form thereon a substantially single elongated light spot for tracking the drawing line, means for varying the length of the light spot upon said pattern, and a manually operable handle element projecting from said platform to facilitate the manual adjustment of the stylus head about its pivot axis.

15. An embroidering apparatus for forming stitches in a workpiece in accordance with a line on a drawing, comprising, a zigzag-stitch sewing machine having an endwise reciprocatory and laterally vibratory needle, means for varying the amplitude of the lateral vibrations of said needle, a manually operable design-reproducing frame, a stylus head carried by one end of said frame for tracking the drawing, means carried by the other end of said frame for presenting the workpiece beneath the needle and for shifting the work relative to the sewing machine in response to the movements of said frame, means carried by said stylus head for throwing a light spot upon the drawing for directly tracking the drawing lines, and means for altering the dimensions of the light spot.

16. An embroidering apparatus for forming stitches in a workpiece in accordance with a line on a drawing, comprising, a zigzag-stitch sewing machine having an endwise reciprocatory and laterally vibratory needle, means for varying the amplitude of the lateral vibrations of said needle, a manually operable design-reproducing frame, a stylus head carried by one end of said frame for tracking the drawing, means carried on the other end of said frame for presenting the workpiece beneath the needle and for shifting the work relative to the sewing machine in response to the movements of said frame, means carried by said stylus head for throwing a light spot upon the drawing for directly tracking the drawing lines, means for altering the dimensions of the light spot, and means for simultaneously varying the amplitude of lateral needle vibration and the dimensions of the light spot so that the light spot will give a visual indication of the stitch width.

17. An embroidering apparatus for forming stitches in a workpiece in accordance with a line on a drawing, comprising a zigzag-stitch sewing machine having an endwise reciprocatory and laterally vibratory needle, means for varying the amplitude of the lateral vibrations of said needle, a manually operable design-reproducing frame, a stylus head carried by one end of said frame for tracking the drawing, means carried on the other end of said frame for presenting the workpiece beneath the needle and for shifting the work relative to the sewing machine in response to the movements of said frame, means carried by said stylus head for throwing a light spot upon the drawing for directly tracking the drawing lines, means for altering the dimensions of the light spot, means for simultaneously varying the amplitude of lateral needle vibration and the dimensions of the light spot so that the light spot will give a visual indication of the stitch width, and means for adjusting said last mentioned means so as to vary the ratio of adjustment between said lateral needle vibrations and the light spot dimensions.

18. An embroidering apparatus for forming stitches in a workpiece in accordance with a line on a drawing, comprising, a zigzag-stitch sewing machine having an endwise reciprocatory and laterally vibratory needle, means for varying the amplitude of the lateral needle vibrations, a manually operable design-reproducing frame, a stylus head carried by one end of said frame for tracking the drawing, means carried on the other end of said frame for presenting the workpiece beneath the needle and for shifting the work relative to the sewing machine in response to the movements of said frame, a bank of electrical lamps carried by said stylus head, means for directing the light from said lamps so as to form a substantially elongated light spot upon said drawing for directly tracking the drawing lines, and means for altering the length of said light spot.

19. An embroidering apparatus for forming stitches in a workpiece in accordance with a line on a drawing, comprising, a zigzag-stitch sewing machine having an endwise reciprocatory and laterally vibratory needle, means for varying the amplitude of the lateral needle vibration, a manually operable design-reproducing frame, a stylus head carried by one end of said frame for tracking the drawing, means carried on the other end of said frame for presenting the work beneath the needle and for shifting the work relative to the sewing machine in response to the movements of said frame, said stylus head including a platform pivotally mounted upon said frame, a bank of electrical lamps carried by said stylus platform, means for directing the light from said lamps along the pivot axis of said platform and toward the pattern so as to form a substantially elongated light spot upon said pattern for directly tracking the drawing lines, means for altering the length of said light spot, and means for simultaneously varying the amplitude of lateral needle vibration and the length of said light spot so that the latter will give a visual indication of the stitch width.

20. An embroidering apparatus for forming stitches in a workpiece in accordance with a line on a drawing, comprising, a zigzag-stitch sewing machine having an endwise reciprocatory and laterally vibratory needle, adjusting means for varying the amplitude of the lateral needle vibration, a manually operable design-reproducing frame, a stylus head carried by one end of said frame for tracking the drawing, means carried on the other end of said frame for presenting the work beneath the needle and for shifting the work relative to the sewing machine in response to the movements of said frame, said stylus head including a platform pivotally mounted upon said frame, a bank of electrical lamps carried by said stylus platform, means for directing the light from said lamps along the pivot axis of said platform and toward the pattern so as to form a substantially elongated light spot upon said pattern for directly tracking the drawing lines, means including a progressively acting switch electrically connected with said lamps for successively energizing and de-energizing said lamps in a predetermined sequence thereby to vary the length of the light spot, and means for simultaneously actuating said adjusting means and said switch thereby simultaneously to vary the amplitude of lateral needle vibration and the light spot length so that the light spot will give a visual indication of the stitch length.

21. An embroidering apparatus for forming stitches in a workpiece in accordance with a line on a drawing, comprising, a zigzag-stitch sewing machine having an endwise reciprocatory and laterally vibratory needle means for varying the amplitude of the lateral needle vibration, a manually operable design-reproducing frame, a stylus head carried by one end of said frame for tracking the drawing, means carried on the other end of said frame for presenting the work beneath the needle and for shifting the work relative to the sewing machine in response to the movements of said frame, said stylus head including a platform pivotally mounted upon said frame, a bank of electrical lamps carried by said stylus platform, means for directing the light from said lamps along the pivotal axis of said platform and toward the pattern so as to form a substantially elongated light spot upon said pattern for directly tracking the drawing lines, a handle mounted upon said platform for causing relative pivotal movements between said stylus head and said frame arm so that the elongated light spot may be maintained in proper orientation with the drawing lines during the tracking of said arm about the drawing, means for altering the length of said light spot, and means for simultaneously varying the amplitude of lateral needle vibration and the length of said light spot so that the latter will give a visual indication of the stitch width.

EDGAR P. TURNER.
NORRIS H. SAILER.

REFERENCES CITED

The following references are of record in the file of this patent:

UNITED STATES PATENTS

| Number | Name | Date |
|---|---|---|
| 2,207,787 | Eberle | July 16, 1940 |